United States Patent

[11] 3,585,522

[72] Inventors Charles H. Church;
    Edward G. F. Arnott, both of Wilkinsburg, Pittsburgh, Pa.
[21] Appl. No. 600,288
[22] Filed Oct. 3, 1966
[45] Patented June 15, 1971
[73] Assignee Westinghouse Electric Corporation
    Pittsburgh, Pa.
    Continuation-in-part of application Ser. No. 272,678, Apr. 12, 1963, now abandoned.

[54] CYLINDRICAL LIGHT EMITTER
    5 Claims, 3 Drawing Figs.
[52] U.S. Cl. .................................................. 331/94.5, 313/217
[51] Int. Cl. .................................................. H01s 3/09
[50] Field of Search ...................................... 331/94.5; 330/4.3; 313/217, 7

[56] References Cited
    UNITED STATES PATENTS
    3,209,281 9/1965 Colgate et al. ................. 331/94.5

OTHER REFERENCES

Colgate et al., " The Dynamic Pinch as a High-Intensity Light Source for Optical Maser Pumping." ADVANCES IN QUANTUM ELECTRONICS; J. R. Singer, Ed.; Columbia University Press, New York, N.Y.; pp. 288— 292 (1961).

Primary Examiner—William L. Sikes
Assistant Examiner—William L. Sikes
Attorneys—F. H. Henson and E. P. Klipfel ABSTRACT: In combination; an inner transparent cylinder of high compression strength and thermal shock resistant material having an inner bore space; an active material capable of lasering disposed within said inner bore space; a diffusing outer cylinder capable of withstanding tension shock concentrically disposed to said first cylinder and forming a first annular space thereinbetween of 2 to 12 millimeters; an end member, including an electrode portion, disposed at each end of said cylinders and enclosing said first annular space at each end thereof; each said end member having an inner annular recession; the walls of said recession defining a second annular space with the exterior of said inner cylinder to provide an expansion chamber at each end of said first annular space; means for providing gas to said annular spaces; and means for energizing said electrode portions to ionize the gas within said annular spaces.

PATENTED JUN 15 1971

3,585,522

INVENTORS
Charles H. Church and
Edward G.F. Arnott.
BY Ernest P. Klipfel
ATTORNEY 3,585,522

CYLINDRICAL LIGHT EMITTER

This application is a continuation-in-part of U.S. Pat. application Ser. No. 272,678, filed Apr. 12, 1963, now abandoned.

The present invention relates generally to cylindrical light emitters and more particularly relates to a cylindrical emitter of light for the purpose of pumping a laser.

Cylindrical flash sources for pumping an active material capable of lasering have been unable to provide sufficient light output and still withstand the shock resulting from the firing of the gas contained therein. For many applications of lasers, there is a requirement for a very high energy rate pump which is capable of high total energies at relatively high efficiencies. Conventional light sources are unable to provide for sufficient current density. The shock wave which occurs in a pulsed flashlamp tends to destroy the arch container.

Briefly, the present invention provides a cylindrical emitter of light, the construction of which provides both mechanical and optical advantages. The mechanical advantages stem from having a mechanically strong outer cylinder to withstand both the radial and longitudinal stresses due to the high pressure and temperature buildup. At the same time, the active material capable of lasering is optically coupled to a diffuse reflector in very close proximity to the active material. By providing a relatively thin annular space filled with gas the current density is greatly increased thereby allowing greater light output. The construction of an expansion chamber within the cylindrical lamp allows the shock wave which occurs in pulsed flashlamps to be absorbed without destroying the lamp.

Accordingly, an object of the present invention is to provide a new and improved cylindrical emitter of light.

Another object of the present invention is to provide a cylindrical emitter of light capable of intensity outputs heretofore unattainable.

Another object of the present invention is to provide an emitter of light capable of efficiently pumping an active material in the laser pumping light bands.

Further objects and advantages of the present invention will be readily apparent from the following detailed description taken in conjunction with the drawing, in which.

Figure 1:
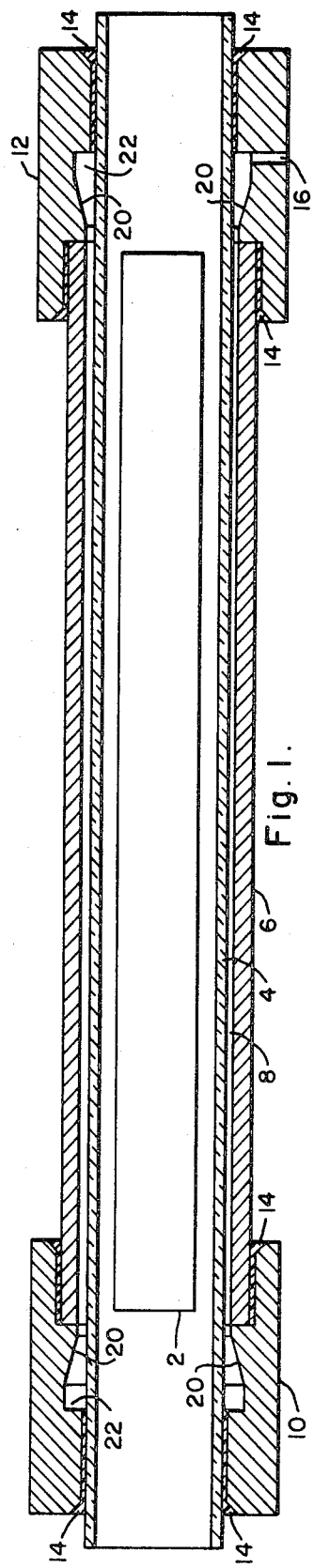
FIG. 1 is a cross-sectional elevational view taken along the line I-I of FIG. 2 of an illustrative embodiment of the present invention.

Referring to FIG. 1, an active material 2 capable of lasering is illustrated disposed within an inner cylindrical member 4 having high compressive strength and which is transparent. The inner cylinder 4 is conventionally made of quartz or other high temperature and thermal shock resistant similar material. An outer cylinder 6 is concentrically disposed to said inner cylinder 4 and forms an annular space 8 thereinbetween. End members 10 and 12 are respectively disposed at opposite ends of the cylinders 4 and 6 and enclose the annular space 8. A thermal and shock resistant adhesive 14 secures the end members 10 and 12 to the cylindrical members 4 and 6. As illustrated, the end members 10 and 12 may be of suitable metal to function as electrodes across the annular space 8. Otherwise, any other suitable material for electrodes may be inserted into the end members 10 and 12. A passageway 16 through the end members 12 provides access for evacuation and filling of the annular space 8 with a suitable gas to be excited upon an ionizing potential being impressed upon the electrode end members 10 and 12.

For optimum optical pumping of the laser material 2 it is necessary to have extremely high current densities with a fast rise time. Towards this end the cylindrical construction of the present invention allows a very low impedance device. It is, in essence, many linear tubes all connected in parallel. The use of the straight line tube lowers the value of inductance and also eliminates any magnetic field effects which do occur when a conventional helical emitter configuration is used around the laser rod. The inner diameter of the outer cylinder 6 is selected to be displaced from the inner cylinder 4 by a very small distance; that is, in the order of several millimeters such as 2 to 12 mm. If the annular space is made too thin then not enough emitters are available for providing a proper light intensity but on the other hand, should the annular space be made too large than too much absorption occurs for the most efficient light output.

To improve the optical coupling the inner surface of the outer cylinder 6 is provided with a diffusing surface. A material such as alumina is used since it is more able to withstand the tension shock which results upon the outer cylinder 6 when the arc is struck in the annular space 8. Where necessary, an epoxy bound glass filament structure may be wound around the outer cylinder 6 to provide the cylinder 6 with precompression thereby improving the elastic properties of the alumina upon occurrence of a shock wave within the annular space 8.

To improve the spectral output of the light emitted from the source 2 the pumping media or gas, which could be xenon or another rare gas at a proper pressure, may have other materials such as mercury or the metallic halides added to the arc discharge plasma. The addition of selective emitting materials possessing strong emission lines to the cylindrical tube 2 yields a system having the advantages of higher resistance and selective emission when compared to the conventional arrangements. It has been found however that such additives in many instances condense in a cooler portion of the tube 2 after firing, thereby not being available to be excited for the next pulse. In such instances, the desirable additives may be incorporated in the electrode material which does not get very not and is not subject to the extreme temperatures during discharge. Since the amount of additive required in the arc is small, the quantity need not be so large as to interfere with the diffuse reflectivity of the outer ring 6.

Figure 2:
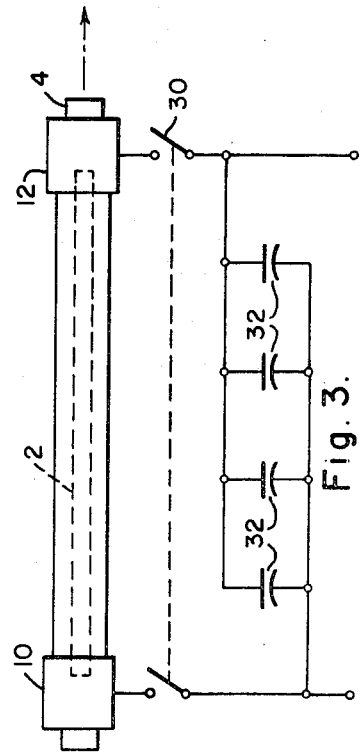
FIG. 2 is an end elevational view of the illustrative embodiment.

Referring again to FIGS. 1 and 2 when an ionizing potential is applied to the end members 10 and 12 the shoulder portions 20 provide the terminal areas for the electric arc struck in the annular space. Immediately behind the terminal areas is located a larger annular space or expansion chamber 22 wherein the shock occurring upon the firing of the lamp 2 may be absorbed. At the same time, the thermal and shock resistant adhesive 14 is capable of flexing with the shock wave to minimize rupturing of the construction.

Figure 3:
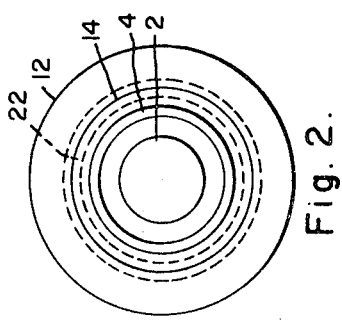
FIG. 3 is a schematic representation of a system utilizing the illustrative embodiment shown in the previous figures.

In operation, it can readily be seen from FIG. 3 that the end members 10 and 12 are connected across an ionizing potential by means of a gang operated switch 30. The switch 30 connects a power supply, illustrated to be of four capacitors 32, across the electrode end members 10 and 12 discharging thereacross and thereby ionizing the gas within the annular space 8.

While the present invention has been described with a degree of particularity for the purposes of illustration, it is to be understood that all equivalents, modifications and alterations within the spirit and scope of the present invention are herein meant to be included.

What we claim is:

1. In combination; an inner transparent cylinder of high compression strength and thermal shock resistant material having an inner bore space; an active material capable of lasering disposed within said inner bore space; a diffusing outer cylinder capable of withstanding tension shock concentrically disposed to said first cylinder and forming a first annular space thereinbetween of 2 to 12 millimeters; an end member, including an electrode portion, disposed at each end of said cylinders and enclosing said first annular space at each end thereof; each said end member having an inner annular recession; the walls of said recession defining a second annular space with the exterior of said inner cylinder to provide an expansion chamber at each end of said first annular space; means for providing gas to said annular spaces; and means for energizing said electrode portions to ionize the gas within said annular spaces.

2. A flashlamp structure which comprises:
an inner elongated tubular member,
an outer elongated tubular member surrounding said inner member coaxial therewith with an annular space therebetween selected to be within the range of 2 to 12 millimeters,
end electrodes surrounding a portion of said inner tubular member and the ends of said outer tubular member,
means associated with said end electrodes for vacuum sealing the space confined between said inner and outer tubular members by said end electrodes, and
means through which said lamp may be evacuated and a gas admitted into the spacing between said inner and outer tubular members.

3. A flashlamp structure as claimed in claim 2, which includes:
a light reflective means around the midsection of said outer tubular member.

4. A flashlamp as claimed in claim 3, in which:
said light reflective means is coated on the inner surface of said outer tubular member.

5. A flashlamp structure as claimed in claim 2 including an epoxy bound glass filament means wound around said outer elongated tubular member to protect said flashlamp structure against internal shock waves.